United States Patent [19]

Miller

[11] Patent Number: 5,082,986
[45] Date of Patent: Jan. 21, 1992

[54] PROCESS FOR PRODUCING LUBE OIL FROM OLEFINS BY ISOMERIZATION OVER A SILICOALUMINOPHOSPHATE CATALYST

[75] Inventor: Stephen J. Miller, San Francisco, Calif.

[73] Assignee: Chevron Research Company, San Francisco, Calif.

[21] Appl. No.: 311,972

[22] Filed: Feb. 17, 1989

[51] Int. Cl.$^5$ ................................................ C07C 5/22
[52] U.S. Cl. ..................................... 585/667; 585/324; 585/668; 208/18
[58] Field of Search ............... 585/500, 664, 667, 668; 208/112, 114, 18, 97

[56] References Cited

U.S. PATENT DOCUMENTS

| | | | |
|---|---|---|---|
| 4,440,871 | 4/1984 | Lok et al. | 208/138 |
| 4,650,917 | 3/1987 | Dessau et al. | 585/329 |
| 4,686,029 | 8/1987 | Pellet et al. | 208/18 |
| 4,689,138 | 8/1987 | Miller | 585/740 |
| 4,710,485 | 12/1987 | Miller | 502/66 |
| 4,740,650 | 4/1988 | Pellet et al. | 585/481 |
| 4,788,378 | 11/1988 | Chang et al. | 585/740 |
| 4,824,554 | 4/1989 | Lok et al. | 208/111 |
| 4,859,311 | 8/1989 | Miller | 208/114 |
| 4,880,760 | 11/1989 | Pellet et al. | 502/64 |
| 4,882,038 | 11/1989 | Lok et al. | 585/667 |
| 4,906,351 | 3/1990 | Pellet et al. | 585/640 |

FOREIGN PATENT DOCUMENTS 0158977 10/1985 European Pat. Off. ............ 502/214

Primary Examiner—Anthony McFarlane
Attorney, Agent, or Firm—T. G. De Jonghe; V. J. Cavalieri

[57] ABSTRACT

The present invention relates to a process for producing a $C_{20}+$ lube oil from olefins or reducing the pour point of a lube oil comprising isomerizing the olefins over a catalyst comprising an intermediate pore size silicoaluminophosphate molecular sieve and at least one Group VIII metal.

44 Claims, 1 Drawing Sheet

PROCESS FOR PRODUCING LUBE OIL FROM OLEFINS BY ISOMERIZATION OVER A SILICOALUMINOPHOSPHATE CATALYST

FIELD OF THE INVENTION

The present invention relates to a process for producing lube oil. More specifically, the present invention relates to a process for producing lube oil from olefins by isomerization over a silicoaluminophosphate catalyst.

BACKGROUND OF THE INVENTION

High-quality lubricating oils are critical for the operation of modern machinery and automobiles. Unfortunately, the supply of natural crude oils having good lubricating properties is not adequate for present demands. Due to uncertainties in world crude oil supplies, high-quality lubricating oils must be produced from ordinary crude feedstocks.

Numerous processes have been proposed for producing lubricating oils that can be converted into other products by upgrading the ordinary and low-quality stocks.

It is desirable to upgrade a crude fraction otherwise unsuitable for lubricant manufacture into one from which good yields of lube oils can be obtained.

Normal alphaolefins boiling in the lube oil range, in general $C_{20}+$, have very high pour points and therefore are unsuitable for use as lube oils. It is known that low pour point oils can be made by polymerization of $C_{10}-$ normal alphaolefins to polyalphaolefin oils.

The production of polyalphaolefin lube oils, however, is limited because polyalphaolefins made with $C_{12}+$ normal alphaolefins have high pour points compared to polyalphaolefins made with $C_{10}-$ normal alphaolefins. Polyalphaolefins have several valuable properties such as low viscosities at low temperatures which improves cold engine starting, reduces friction and increases fuel efficiency, high viscosity indexes and high thermal stability and oxidation resistance which prevents the buildup of sludge, and a high boiling range for its viscosity which minimizes evaporative loss. Up to now, production has been limited because no process has been developed to convert high pour point normal alphaolefins and polyalphaolefins to low pour point lube oils in high yield.

Normal alphaolefins and polyalphaolefins are very expensive starting materials. Isomerization processes are known in the art that are useful to lower the pour point of waxy feeds. However, because the selectivity of such processes is not high, they are unsuitable for use with expensive feeds such as olefinic feeds.

SUMMARY OF THE INVENTION

The present invention overcomes the problems and disadvantages of the prior art by providing a process for producing a $C_{20}+$ lube oil from olefins comprising isomerizing the olefins over a catalyst containing an intermediate pore size silicoaluminophosphate molecular sieve and at least one Group VIII metal.

The present invention also provides a process for reducing the pour point of a $C_{20}+$ lube oil made from olefins comprising isomerizing the oil over a catalyst containing an intermediate pore size silicoaluminophosphate molecular sieve and at least one Group VIII metal.

It is an object of the invention to produce a lube oil having a high viscosity index and a very low pour point.

It is also an object of the invention to provide a lube oil having low frictional resistance.

It is a further object of the invention to provide a lube oil which causes low engine wear.

It is an additional object of the invention to provide a lube oil which provides increased fuel efficiency.

It is yet a further object of the invention to provide a lube oil having high oxidation resistance and thermal stability.

It is an additional object of the invention to provide a lube oil having low volatility for its viscosity.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a process for producing a $C_{20}+$ lube oil comprising isomerizing an olefin feed over a catalyst comprising an intermediate pore size silicoaluminophosphate molecular sieve and at least one Group VIII metal.

The invention also provides a process for reducing the pour point of a $C_{20}+$ lube oil made from olefins comprising isomerizing the oil over a catalyst containing an intermediate pore size silicoaluminophosphate molecular sieve and at least one Group VIII metal.

The lube oil produced by the process of the invention has a high paraffinic content. Due to such content, the lube oil has a low viscosity for its boiling range which results in less frictional resistance, less engine wear and increased fuel efficiency. The low viscosity and low pour point of the lube oil result in improved cold engine starting. The lube oil has a high viscosity index ranging from about 120 to about 180 and a very low pour point, ranging from less than about $-80°$ F. to about $15°$ F. Since little or no viscosity index improver compositions or pour point depressant compositions need to be added to the lube oil of the invention, fewer performance-decreasing deposits are formed. The high paraffinic nature of the lube oil of the invention gives it high oxidation and thermal stability. Further, since the lube oil has a high boiling range for its viscosity, volatility is low, which results in little loss of oil by evaporation.

DESCRIPTION OF THE PREFERRED EMBODIMENTS

Figure 1:
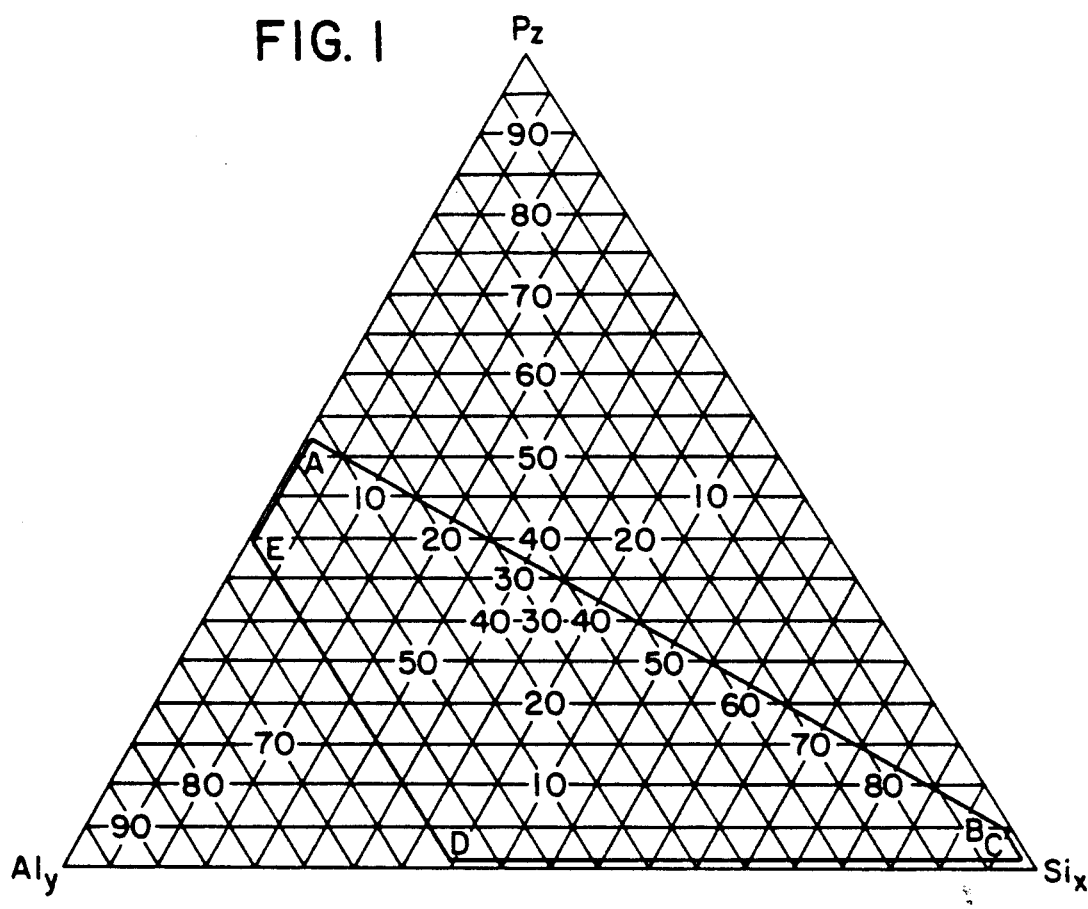
FIG. 1 is a ternary diagram showing the compositional parameters of the silicoaluminophosphate catalysts of U.S. Pat. No. 4,440,871 in terms of mole fractions of silicon, aluminum and phosphorus.

Reference will now be made in detail to the present preferred embodiments of the invention.

Exemplary suitable olefin feeds for use in the processes of the invention include normal internal olefins, normal alphaolefins, branched olefins and combinations thereof. Preferably, the olefin employed is a $C_{20}+$ olefin.

Normal alphaolefin feeds generally do not contain 100% normal alphaolefins but rather contain various quantities of internal olefins and branched olefins. $C_{20}+$ normal alphaolefins are waxy and have a high pour point and are suitable for use in the processes of the invention.

Feeds containing branched olefins having at least twenty carbon atoms, e.g. polyalphaolefins, are suitable for use in the processes of the invention. Feeds such as dimers and trimers of normal alphaolefins having at least ten carbon atoms, preferably at least twelve carbon atoms, co-dimers, co-trimers and higher oligomers of normal alphaolefins are also suitable for use in the processes of the invention. However, such feeds may have high viscosity indexes but have pour points too high to be useful at low temperatures.

By "intermediate pore size", as used herein, is meant an effective pore aperture in the range of from about 5.3 to about 6.5 Angstroms when the molecular sieve is in the calcined form. Molecular sieves having pore apertures in this range tend to have unique molecular sieving characteristics. Unlike small pore zeolites such as erionite and chabazite, they will allow hydrocarbons having some branching into the molecular sieve void spaces. Unlike larger pore zeolites such as the faujasites and mordenites, they can differentiate between n-alkanes and slightly branched alkanes on the one hand and larger branched alkanes having, for example, quaternary carbon atoms.

The effective pore size of the molecular sieves can be measured using standard adsorption techniques and hydrocarbonaceous compounds of known minimum kinetic diameters. See Breck, *Zeolite Molecular Sieves*, 1974 (especially Chapter 8); Anderson et al., J. Catalysis 58, 114 (1979); and U.S. Pat. No. 4,440,871, all of which are incorporated herein by reference.

Intermediate pore size molecular sieves will typically admit molecules having kinetic diameters of 5.3 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 Angstroms include: cyclohexane (6.0), 2,3-dimethylbutane (6.1), and m-xylene (6.1). Generally, compounds having kinetic diameters of greater than about 6.5 Angstroms do not penetrate the pore apertures and thus are not absorbed into the interior of the molecular sieve lattice. Examples of such larger compounds include: o-xylene (6.8), 1,3,5-trimethylbenzene (7.5), and tributylamine (8.1).

The preferred effective pore size range is from about 5.5 to about 6.2 Angstroms.

In performing adsorption measurements to determine pore size, standard techniques are used. It is convenient to consider a particular molecule as excluded if it does not reach at least 95% of its equilibrium adsorption value on the molecular sieve in less than about 10 minutes ($p/p_o=0.5$; 25° C.).

The intermediate pore size silicoaluminophosphate molecular sieve used in the processes of the present invention has an acidic component and a platinum and/or palladium hydrogenation component. The acidic component most preferably comprises a SAPO-11 intermediate pore size silicoaluminophosphate molecular sieve, which is described in U.S. Pat. No. 4,440,871, the pertinent disclosure of which is incorporated herein by reference.

The SAPO-11 intermediate pore size silicoaluminophosphate molecular sieve comprises a molecular framework of corner-sharing $[SiO_2]$ tetrahedra, $[AlO_2]$ tetrahedra and $[PO_2]$ tetrahedra, [i.e., $(Si_xAl_yP)O_2$ tetrahedral units]. When combined with a platinum or palladium hydrogenation component, the SAPO-11 silicoaluminophosphate molecular sieve converts the waxy components to produce a lubricating oil having excellent yield, very low pour point, low viscosity and a high viscosity index.

Figure 2:
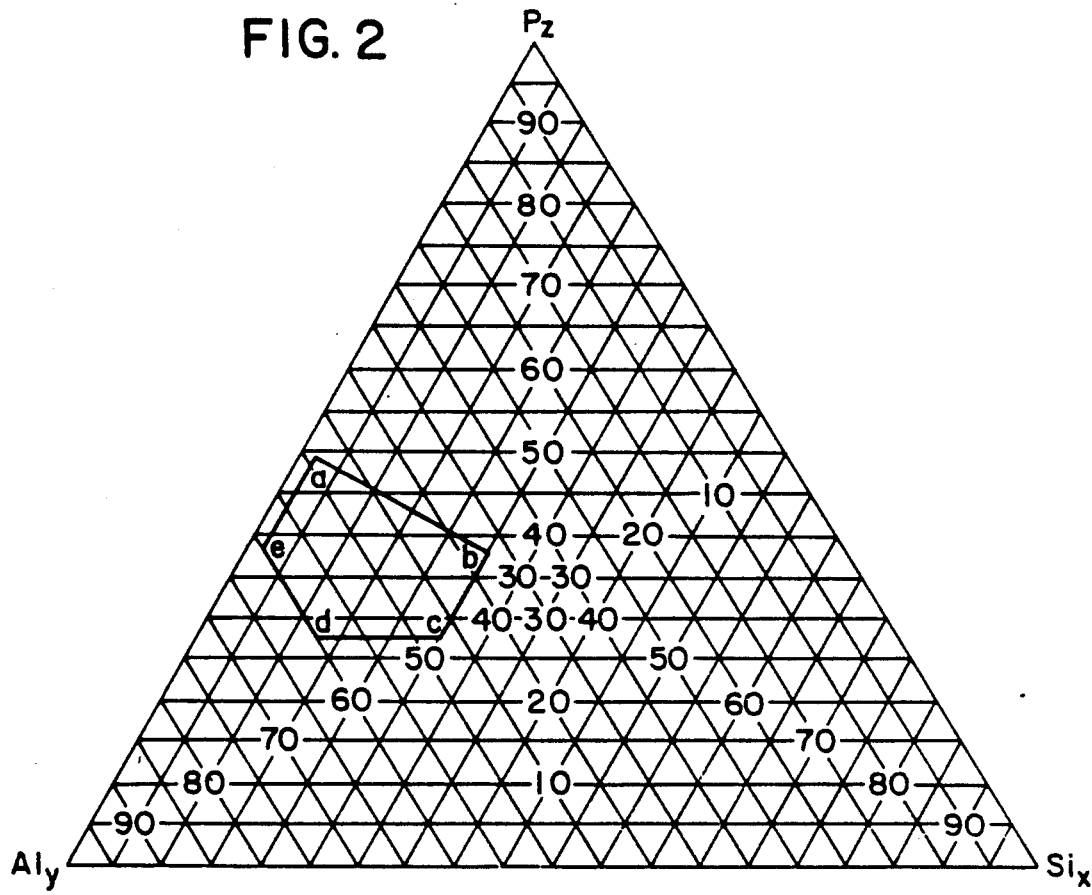
FIG. 2 is a ternary diagram showing the preferred compositional parameters of the silicoaluminophosphate catalysts of mole fraction of silicon, aluminum and phosphorus.

SAPO-11 comprises a silicoaluminophosphate material having a three-dimensional microporous crystal framework structure of $[PO_2]$, $[AlO_2]$ and $[SiO_2]$ tetrahedral units whose unit empirical formula on an anhydrous basis is:

$$mR:(Si_xAl_yP_z)O_2 \qquad (I)$$

wherein "R" represents at least one organic templating agent present in the intracrystalline pore system; "m" represents the moles of "R" present per mole of $(Si_xAl_yP_z)O_2$ and has a value of from zero to about 0.3, "x", "y" and "z" represent respectively, the mole fractions of silicon, aluminum and phosphorus, said mole fractions being within the compositional area bounded by points A, B, C, D and E on the ternary diagram of FIG. 1 or preferably within the area bounded by points a, b, c, d and e on the ternary diagram of FIG. 2. The silicoaluminophosphate molecular sieve has a characteristic X-ray powder diffraction pattern which contains at least the d-spacings (as-synthesized and calcined) set forth below in Table I. When SAPO-11 is in the as-synthesized form "m" preferably has a value of from 0.02 to 0.3.

TABLE I

| 2θ | d | Relative Intensity |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m-s |

All of the as-synthesized SAPO-11 compositions for which X-ray powder diffraction data have been obtained to data have patterns which are within the generalized pattern of Table II below.

TABLE II

| 2θ | d | 100 × I/I$_o$ |
|---|---|---|
| 8.05–8.3 | 10.98–10.65 | 20–42 |
| 9.4–9.65 | 9.41–9.17 | 36–58 |
| 13.1–13.4 | 6.76–6.61 | 12–16 |
| 15.6–15.85 | 5.68–5.59 | 23–38 |
| 16.2–16.4 | 5.47–5.40 | 3–5 |
| 18.95–19.2 | 4.68–4.62 | 5–6 |
| 20.3–20.6 | 4.37–4.31 | 36–49 |
| 21.0–21.3 | 4.23–4.17 | 100 |
| 22.1–22.35 | 4.02–3.99 | 47–59 |
| 22.5–22.9 (doublet) | 3.95–3.92 | 55–60 |
| 23.15–23.35 | 3.84–3.81 | 64–74 |
| 24.5–24.9 (doublet) | 3.63–3.58 | 7–10 |
| 26.4–26.8 (doublet) | 3.38–3.33 | 11–19 |
| 27.2–27.3 | 3.28–3.27 | 0–1 |
| 28.3–28.5 (shoulder) | 3.15–3.13 | 11–17 |

TABLE II-continued

| 2θ | d | 100 × I/I₀ |
|---|---|---|
| 28.6–28.85 | 3.121–3.094 | |
| 29.0–29.2 | 3.079–3.058 | 0–3 |
| 29.45–29.65 | 3.033–3.013 | 5–7 |
| 31.45–31.7 | 2.846–2.823 | 7–9 |
| 32.8–33.1 | 2.730–2.706 | 11–14 |
| 34.1–34.4 | 2.629–2.607 | 7–9 |
| 35.7–36.0 | 2.515–2.495 | 0–3 |
| 36.3–36.7 | 2.475–2.449 | 3–4 |
| 37.5–38.0 (doublet) | 2.398–2.368 | 10–13 |
| 39.3–39.55 | 2.292–2.279 | 2–3 |
| 40.3 | 2.238 | 0–2 |
| 42.2–42.4 | 2.141–2.132 | 0–2 |
| 42.8–43.1 | 2.113–2.099 | 3–6 |
| 44.8–45.2 (doublet) | 2.023–2.006 | 3–5 |
| 45.9–46.1 | 1.977–1.969 | 0–2 |
| 46.8–47.1 | 1.941–1.929 | 0–1 |
| 48.7–49.0 | 1.870–1.859 | 2–3 |
| 50.5–50.8 | 1.807–1.797 | 3–4 |
| 54.6–54.8 | 1.681–1.675 | 2–3 |
| 55.4–55.7 | 1.658–1.650 | 0–2 |

SAPO-31 intermediate pore size silicoaluminophosphate molecular sieve, also preferred for use in the processes of the invention, comprises an intermediate pore size silicoaluminophosphate molecular sieve having a three-dimensional microporous crystal framework of [PO₂], [AlO₂] and [SiO₂] tetrahedral units whose unit empirifcal formula on an anhydrous basis is:

$$mR:(Si_xAl_yP_z)O_2$$

wherein R represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorus, said mole fractions being within the compositional area bounded by points A, B, C, D and E on the ternary diagram of FIG. 1, or preferably within the area bounded by points a, b, c, d and e on the ternary diagram of FIG. 2. The silicoaluminophosphate molecular sieve has a characteristic X-ray powder diffraction pattern (as-synthesized and calcined) which contains at least the d-spacings set forth below in Table III. When SAPO-31 is in the as-synthesized form, "m" preferably has a value of from 0.02 to 0.3.

TABLE III

| 2θ | d | Relative Intensity |
|---|---|---|
| 8.5–8.6 | 10.40–10.28 | m-s |
| 20.2–20.3 | 4.40–4.37 | m |
| 21.9–22.1 | 4.06–4.02 | w-m |
| 22.6–22.7 | 3.93–3.92 | vs |
| 31.7–31.8 | 2.823–2.814 | w-m |

All of the as-synthesized SAPO-31 compositions for which X-ray powder diffraction data have presently been obtained have patterns which are within the generalized pattern of Table IV below.

TABLE IV

| 2θ | d | 100 × I/I₀ |
|---|---|---|
| 6.1 | 14.5 | 0–1 |
| 8.5–8.6* | 10.40–10.28 | 60–72 |
| 9.5* | 9.31 | 7–14 |
| 13.2–13.3* | 6.71–6.66 | 1–4 |
| 14.7–14.8 | 6.03–5.99 | 1–2 |
| 15.7–15.8* | 5.64–5.61 | 1–8 |
| 17.05–17.1 | 5.20–5.19 | 2–4 |
| 18.3–18.4 | 4.85–4.82 | 2–3 |
| 20.2–20.3 | 4.40–4.37 | 44–55 |
| 21.1–21.2* | 4.21–4.19 | 6–28 |
| 21.9–22.1* | 4.06–4.02 | 32–38 |
| 22.6–22.7* | 3.93–3.92 | 100 |
| 23.3–23.35* | 3.818–3.810 | 2–20 |
| 25.1* | 3.548 | 3–4 |
| 25.65–25.75 | 3.473–3.460 | 2–3 |
| 26.5* | 3.363 | 1–4 |
| 27.9–28.0 | 3.198–3.187 | 8–10 |
| 28.7* | 3.110 | 0–2 |
| 29.7 | 3.008 | 4–5 |
| 31.7–31.8 | 2.823–2.814 | 15–18 |
| 32.9–33.0* | 2.722–2.714 | 0–3 |
| 35.1–35.2 | 2.557–2.550 | 5–8 |
| 36.0–36.1 | 2.495–2.488 | 1–2 |
| 37.2 | 2.417 | 1–2 |
| 37.9–38.1* | 2.374–2.362 | 2–4 |
| 39.3 | 2.292 | 2–3 |
| 43.0–43.1* | 2.103–2.100 | 1 |
| 44.8–45.2* | 2.023–2.006 | 1 |
| 46.6 | 1.949 | 1–2 |
| 47.4–47.5 | 1.918 | 1 |
| 48.6–48.7 | 1.872–1.870 | 2 |
| 50.7–50.8 | 1.801–1.797 | 1 |
| 51.6–51.7 | 1.771–1.768 | 2–3 |
| 55.4–55.5 | 1.658–1.656 | 1 |

*Possibly contains peak from a minor impurity.

SAPO-41 intermediate pore size silicoaluminophosphate molecular sieve, also preferred for use in the processes of the invention, comprises an intermediate pore size silicoaluminophosphate molecular sieve having a three-dimensional microporous crystal framework structure of [PO₂], [AlO₂] and [SiO₂] tetrahedral units, and whose unit empirical formula on an anhydrous basis is:

$$mR:(Si_xAl_yP_z)O_2$$

wherein R represents at least one organic templating agent present in the intracrystalline pore system; "m" represents the moles of "R" present per mole of $(Si_xAl_yP_z)O_2$ and has a value of from zero to 0.3; "x", "y", and "z" represent respectively, the mole fractions of silicon, aluminum and phosphorus, said mole fractions being within the compositional area bounded by points A, B, C, D and E on the ternary diagram of FIG. 1, or preferably within the area bounded by points a, b, c, d and e on the ternary diagram of FIG. 2, said silicoaluminophosphate having a characteristic X-ray powder diffraction pattern (as-synthesized and calcined) which contains at least the d-spacings set forth below in Table V. When SAPO-41 is in the as-synthesized form "m" preferably has a value of from 0.02 to 0.3.

TABLE V

| 2θ | d | Relative Intensity |
|---|---|---|
| 13.6–13.8 | 6.51–6.42 | w-m |
| 20.5–20.6 | 4.33–4.31 | w-m |
| 21.1–21.3 | 4.21–4.17 | vs |
| 22.1–22.3 | 4.02–3.99 | m-s |
| 22.8–23.0 | 3.90–3.86 | m |
| 23.1–23.4 | 3.82–3.80 | w-m |
| 25.5–25.9 | 3.493–3.44 | w-m |

All of the as-synthesized SAPO-41 compositions for which X-ray powder diffraction data have presently been obtained have patterns which are within the generalized pattern of Table VI below.

TABLE VI

| 2Θ | d | 100 × I/I₀ |
| --- | --- | --- |
| 6.7–6.8 | 13.19–12.99 | 15–24 |
| 9.6–9.7 | 9.21–9.11 | 12–25 |
| 13.6–13.8 | 6.51–6.42 | 10–28 |
| 18.2–18.3 | 4.87–4.85 | 8–10 |
| 20.5–20.6 | 4.33–4.31 | 10–32 |
| 21.1–21.3 | 4.21–4.17 | 100 |
| 22.1–22.3 | 4.02–3.99 | 45–82 |
| 22.8–23.0 | 3.90–3.87 | 43–58 |
| 23.1–23.4 | 3.82–3.80 | 20–30 |
| 25.2–25.5 | 3.53–3.49 | 8–20 |
| 25.5–25.9 | 3.493–3.44 | 12–28 |
| 29.3–29.5 | 3.048–3.028 | 17–23 |
| 31.4–31.6 | 2.849–2.831 | 5–10 |
| 33.1–33.3 | 2.706–2.690 | 5–7 |
| 37.6–37.9 | 2.392–2.374 | 10–15 |
| 38.1–38.3 | 2.362–2.350 | 7–10 |
| 39.6–39.8 | 2.276–2.265 | 2–5 |
| 42.8–43.0 | 2.113–2.103 | 5–8 |
| 49.0–49.3 | 1.856–1.848 | 1–8 |
| 51.5 | 1.774 | 0–8 |

The process of the invention may also be carried out by using a catalyst comprising an intermediate pore size nonzeolitic molecular sieve containing $AlO_2$ and $PO_2$ tetrahedral oxide units, and at least one Group VIII metal. Exemplary suitable intermediate pore size nonzeolitic molecular sieves are set forth in European Patent Application No. 158,977 which is incorporated herein by reference.

When used in the present process, the intermediate pore size molecular sieve is used in admixture with at least one Group VIII metal. Preferably, the Group VIII metal is selected from the group consisting of at least one of platinum and palladium, and optionally other catalytically active metals such as molybdenum, nickel, vanadium, cobalt, tungsten, zinc, and mixtures thereof. More preferably, the Group VIII metal is selected from the group consisting of at least one of platinum and palladium. The amount of metal ranges from about 0.01% to about 10% by weight of the molecular sieve, preferably from about 0.2 to about 5% by weight of the molecular sieve. The techniques of introducing catalytically active metals to a molecular sieve are disclosed in the literature, and pre-existing metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960; 3,373,109; 4,202,996; 4,440,781 and 4,710,485 which are incorporated herein by reference.

The term "metal" or "active metal" as used herein means one or more metals in the elemental state or in some form such as sulfide, oxide and mixtures thereof. Regardless of the state in which the metallic component actually exists, the concentrations are computed as if they existed in the elemental state.

The physical form of the catalyst depends on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. The catalyst may be employed either as a fluidized catalyst, or in a fixed or moving bed, and in one or more reaction stages.

The catalytic isomerization step of the invention may be conducted by contacting the feed with a fixed stationary bed of catalyst, with a fixed fluidized bed, or with a transport bed. A simple and therefore preferred configuration is a trickle-bed operation in which the feed is allowed to trickle through a stationary fixed bed, preferably in the presence of hydrogen.

The catalytic isomerization conditions employed depend on the feed used and the desired pour point. Generally, the temperature is from about 200° C. to about 475° C., preferably from about 250° C. to about 450° C. The pressure is typically from about 15 psig to about 2000 psig, preferably from about 50 psig to about 1000 psig, more preferably from about 100 psig to about 600 psig. The process of the invention is preferably carried out at low pressure. The liquid hourly space velocity (LHSV) is preferably from about 0.05 to about 20, more preferably from about 0.1 to about 5, most preferably from about 0.1 to about 1.0. Low pressure and low liquid hourly space velocity provides improved selectivity, thus resulting in more isomerization and less cracking of the feed and an increased yield.

Hydrogen is preferably present in the reaction zone during the isomerization process. The hydrogen to feed ratio is typically from about 500 to about 30,000 SCF/bbl (standard cubic feet per barrel), preferably from about 1,000 to about 20,000 SCF/bbl. Generally, hydrogen will be separated from the product and recycled to a reaction zone.

The crystalline catalyst used in the isomerization step provides selective conversion of the waxy components to non-waxy components. During processing, isomerization of the oil occurs to reduce its pour point below that of the feed and form a lube oil which has a low pour point and excellent viscosity index.

Because of the selectivity of the intermediate pore size molecular sieve used in the isomerization step of this invention, the yield of low boiling product made by cracking is reduced, thereby preserving the economic value of the feedstock.

The intermediate pore size molecular sieve can be manufactured into a wide variety of physical forms. The molecular sieves can be in the form of a powder, a granule, or a molded product, such as an extrudate having a particle size sufficient to pass through a 2-mesh (Tyler) screen and be retained on a 40-mesh (Tyler) screen. In cases wherein the catalyst is molded, such as by extrusion with a binder, the silicoaluminophosphate can be extruded before drying, or dried or partially dried and then extruded.

The molecular sieve can be composited with other materials resistant to temperatures and other conditions employed in the dewaxing process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the isomerization process so that products can be obtained economically without employing other means for controlling the rate of reaction. The molecular sieve may be incorporated into naturally occurring clays, e.g., bentonite and kaolin. These materials, i.e., clays, oxides, etc., function, in part, as binders for the catalyst.

It is desirable to provide a catalyst having good crush strength because in petroleum refining, the catalyst is often subjected to rough handling. This tends to break the catalyst down into powder-like materials which cause problems in processing.

Naturally occurring clays which can be composited with the molecular sieve include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the molecular sieve can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-titania, silica-alumina-magnesia and silica-magnesia-zirconia. The matrix can be in the form of a cogel.

The catalyst used in the process of this invention can also be composited with other zeolites such as synthetic and natural faujasites, (e.g., X and Y) erionites, and mordenites. It can also be composited with purely synthetic zeolites such as those of the ZSM series. The combination of zeolites can also be composited in a porous inorganic matrix.

It is often desirable to use mild hydrogenation referred to as hydrofinishing to produce more stable lubricating oils. The hydrofinishing step can be performed after the isomerization step. Hydrofinishing is typically conducted at temperatures ranging from about 190° C. to about 340° C., at pressures of from about 400 psig to about 3000 psig, at space velocities (LHSV) of from about 0.1 to about 20, and hydrogen recycle rates of from about 400 to about 1500 SCF/bbl. The hydrogenation catalyst employed must be active enough not only to hydrogenate the olefins, diolefins and color bodies within the lube oil fractions, but also to reduce the content of any aromatics present. The hydrofinishing step is beneficial in preparing an acceptably stable lubricating oil since unhydrofinished lubricant oils tend to be unstable in air and light and tend to spontaneously and quickly form sludges.

Suitable hydrogenation catalysts include conventional metallic hydrogenation catalysts, particularly the Group VIII metals such as cobalt, nickel, palladium and platinum. The metals are typically associated with carriers such as bauxite, alumina, silica gel, silica-alumina composites, and crystalline aluminosilicate zeolites. Palladium is a particularly preferred hydrogenation metal. If desired, non-noble Group VIII metals can be used with molybdates. Metal oxides or sulfides can be used. Suitable catalysts are disclosed in U.S. Pat. Nos. 3,852,207; 4,157,294; 3,904,513 and 4,673,487, which are incorporated herein by reference.

Processes for producing normal alphaolefins are known in the art. Exemplary suitable processes are described in U.S. Pat. Nos. 3,477,813 and 3,482,000, which disclosures are incorporated herein by reference. Similarly, processes for producing polyalphaolefins are also known in the art. Exemplary suitable processes are described in U.S. Pat. Nos. 3,382,291 and 3,742,082.

A $C_{20}+$ fraction of a normal alphaolefin or polyalphaolefin suitable for use in the processes of the invention can be obtained by distillation of the product of the above processes.

The processes of the present invention may be employed in combination with conventional dewaxing processes, i.e., catalytic dewaxing processes and solvent dewaxing processes. Exemplary suitable catalytic dewaxing processes are set forth in U.S. Pat. Nos. 3,700,585; 3,894,938; 4,176,050; 4,181,598; 4,222,855; 4,229,282 and 4,247,388. Exemplary suitable solvent dewaxing processes are set forth in U.S. Pat. No. 4,547,287.

The lube oil produced by the processes of the invention may be used as a blending component with polyalphaolefins. The lube oil can also be used as a blending component with mineral oils to improve the viscosity and viscosity index properties of those oils and can be combined with isomerized petroleum wax.

This invention will be further clarified by the following examples, which are intended to be purely exemplary of the invention.

EXAMPLE 1

SAPO-11 was prepared as follows:

472.4 g of 85% $H_3PO_4$ were added to 1208 g of distilled $H_2O$ in a Teflon beaker in an ice bath. 816.8 g of aluminum isopropoxide ($Al[OC_3H_7]_3$) were slowly added with mixing and then mixed until homogenous. Then 120 g of fumed silica (Cabosil M-5) were added with mixing. Next, 182.4 g of di-n-propylamine ($Pr_5NH$) were added, followed by 9.0 g of 85% $H_3PO_4$. Final mixing was done using a Polytron. The mixture had a pH of 6.5 and the following composition, expressed in molar ratio of oxides:

$$0.9Pr_2NH:SiO_2:Al_2O_3:1.04P_2O_5:36H_2O$$

The mixture was placed in a Teflon bottle in a stainless steel pressure vessel and heated for 5 days at 200° C. with no stirring and autogenous pressure. The supernatant liquid was removed and the product was filtered, washed with water, dried overnight at 121° C., and calcined in air for 8 hours at 566° C. The average crystallite size was less than 0.5 micron. The product was identified as SAPO-11 by X-ray diffraction analysis. Elemental analysis of the calcined sieve showed it to have the following anhydrous molar composition:

$$0.37SiO_2:Al_2O_3:P_2O_5$$

The sieve was bound with 35% Catapal alumina and made into 1/10 inch extrudate. The extrudate was dried 3 hours at 121° C., calcined in air for 4 hours at 454° C., then impregnated with 0.5% Pt (as $Pt(NH_3)_4Cl_2 \cdot H_2O$) by the pore-fill method. It was then dried for 2 hours at 93° C., 2 hours at 149° C., and calcined in air for 8 hours at 454° C. For the following examples, the catalyst was crushed and screened to 24–42 mesh.

EXAMPLE 2

The catalyst of Example 1 was used to dewax a $C_{20}$–$C_{24}$ normal alphaolefin wax (Table VII), running with 8M SCF/bbl once-through $H_2$. Results with this feed are given in Table VIII, in which 600° F.+ yield is defined as:

$$\left[1 - \frac{g\ 600°\ F.+\ (feed) - g\ 600°\ F.+\ (product)}{g\ 600°\ F.+\ (feed)}\right] \times 100\%$$

The data also shows the yield benefit operating at 160 psig versus 400 psig.

EXAMPLE 3

The catalyst of Example 1 was used to dewax a $C_{24}$–$C_{28}$ normal alphaolefin wax (Table IX), running with 8M SCF/bbl once-through $H_2$. Results with this feed are given in Table X.

EXAMPLE 4

The catalyst of Example 1 was used to dewax a $C_{30}+$ normal alphaolefin wax (Table XI) at 160 psig, 620° F., 0.3 LHSV, and 8M SCF/bbl once-through $H_2$. The yield of 600° F.+ lube oil was 52.3 weight percent. The 600° F.+ product was separated by distillation into a 2 cSt viscosity (at 100° C.) fraction, a 4 cSt fraction, and a heaver lube fraction. Yields and product inspections are given in Table XII, and demonstrate that the present invention can be used to convert a high pour point wax into a very low pour point, high VI oil.

EXAMPLE 5

The $C_{30}+$ NAO feed of Table XI was distilled to produce a 900° F.− boiling fraction. The simulated distillation analysis of this fraction is given in Table XIII. The fraction was reacted over the same catalyst, and at the same conditions, as in Example 4 except for a catalyst temperature of 650° F. The yield of 600° F.+ lube oil was 69.0 wt %. The 600° F.+ product was separated by distillation into a 2 cSt viscosity fraction and a 4 cSt fraction. Yields and product inspections are given in Table XIV.

EXAMPLE 6

A $C_{14}$ polyalphaolefin oil was prepared from tetradecene at 86.7% conversion in a conventional continuous process using $BF_3$ with 1-propanol cocatalyst modified with ethyl propionate. Inspections of the $C_{14}$ PAO are given in Table XV. This oil was isomerized over the catalyst of Example 4 at 0.3 LHSV, 300 psig, 675° F., and 8M SCF/bbl $H_2$. The 700° F.+ yield was 78.7 wt %. Inspections of the 700° F.+ product are given in Table XVI, showing substantial pour point reduction and low viscosity at low temperatures.

TABLE VII

| $C_{20}$–$C_{24}$ Normal Alphaolefin Wax | |
|---|---|
| Simulated Distillation, LV %, °F. | |
| ST/5 | 636/647 |
| 10/30 | 651/655 |
| 50 | 661 |
| 70/90 | 697/702 |
| 95/99 | 705/738 |
| Carbon Number Distribution, Wt. % | |
| $C_{20}$ | 55 |
| $C_{22}$ | 40 |
| $C_{24}$ | 5 |

TABLE VIII

Isomerizing $C_{20}$–$C_{24}$ NAO

| Pressure, psig | LHSV | Catalyst Temperature, °F. | 600° F.+ Yield, Wt % | Pour/Cloud, °C. | Viscosity at 40/100° C., cSt | VI |
|---|---|---|---|---|---|---|
| 400 | 1.0 | 600 | 49.5 | 0/+5 | 6.264/2.147 | 167 |
|  | 0.5 | 550 | 62.0 | −3/0 | 6.009/2.063 | 158 |
|  |  | 575 | 45.7 | −9/−4 | 5.641/1.967 |  |
| 160 | 0.5 | 575 | 79.1 | −12/−8 | 6.155/2.095 | 157 |
|  |  | 600 | 66.3 | −21/−21 | 5.922/2.121 |  |
|  |  | 625 | 49.0 | −36/−33 | 5.842/2.003 | 149 |

TABLE IX

| $C_{24}$–$C_{28}$ Normal Alphaolefins | |
|---|---|
| Viscosity, 100° C., cSt | 3.496 |
| Simulated Distillation, LV %, °F. | |
| ST/5 | 728/736 |
| 10/30 | 738/776 |
| 50 | 781 |
| 70/90 | 812/848 |
| 95/99 | 902/1019 |
| Carbon Number Distribution, Wt. % | |
| $C_{24}$ | 17 |
| $C_{26}$ | 40 |
| $C_{28}$ | 25 |
| $C_{30}+$ | 18 |

TABLE X

Isomerizing $C_{24}$–$C_{28}$ NAO

| Pressure, psig | LHSV | Catalyst Temperature, °F. | 650° F.+ Yield, Wt % | Pour/Cloud, °C. | Viscosity at 40/100° C., cSt | VI |
|---|---|---|---|---|---|---|
| 100 | 0.5 | 600 | 72.2 | −30/−20 | 13.10/3.478 | 151 |
| 160 | 0.25 | 600 | 80.2 | −24/−12 | 13.29/3.537 | 156 |
|  |  | 630 | 62.3 | −39/<−63 | 11.99/3.233 | 143 |

TABLE XI

| $C_{30}+$ Normal Alphaolefins | |
|---|---|
| Pour Point, °C. | +72 |
| Viscosity, 100° C., cSt | 7.478 |
| Simulated Distillation, LV %, °F. | |
| ST/5 | 802/807 |
| 10/30 | 809/844 |
| 50 | 893 |
| 70/90 | 931/1026 |
| 95/99 | 1087/1139 |

TABLE XII

Properties of 600° F.+ Product from $C_{30}+$ NAO at 52% Yield

| 2 cSt Oil (600–715° F.) | |
|---|---|
| LV % | 11.1 |
| Pour/Cloud, °C. | −60/ |
| Vis, 40/100° C., cSt | 7.326/2.251 |
| VI | 120 |

TABLE XII-continued

Properties of 600° F.+ Product from $C_{30}+$ NAO at 52% Yield

| Sim Dist., LV %, °F. | |
|---|---|
| 10/30 | 520/616 |
| 50/90 | 687/813 |
| 4 cSt Oil (715-890° F.) | |
| LV % | 34.6 |
| Pour/Cloud, °C. | −57/−51 |
| Vis, 40/100° C., cSt | 18.57/4.200 |
| VI | 133 |
| Sim Dist., LV %, °F. | |
| 10/30 | 730/783 |
| 50/90 | 814/895 |
| High Vis Oil (890° F.+) | |
| LV % | 54.3 |
| Pour/Cloud, °C. | −57/<−63 |
| Vis, 40/100° C., cSt | 78.92/11.94 |
| VI | 146 |
| Sim Dist., LV %, °F. | |
| 10/30 | 932/965 |
| 50/90 | 999/1077 |

TABLE XIII

Simulated Distillation of 900° F.− Fraction of $C_{30}+$ Normal Alphaolefin

| LV % | °F. |
|---|---|
| ST/5 | 661/772 |
| 10/30 | 776/812 |
| 50 | 840 |
| 70/90 | 848/879 |
| 95/99 | 900/948 |

TABLE XIV

Inspections of 600° F.+ Product from 900° F.− $C_{30}+$ NAO at 69 Wt % Yield

| 2 cSt Oil (600-715° F.) | |
|---|---|
| LV % | 7.9 |
| Sim Dist., LV %, °F. | |
| 10/30 | 528/581 |
| 50/90 | 623/761 |
| 4 cSt Oil (715° F.+) | |
| LV % | 92.1 |
| Pour/Cloud, °C. | −54/−41 |
| Vis, 40/100° C., cSt | 15.76/3.828 |
| VI | 139 |
| Sim. Dist., LV %, °F. | |
| 10/30 | 727/776 |
| 50/90 | 800/851 |

TABLE XV

Inspections of $C_{14}$ PAO

| Pour/Cloud Point, °C. | −26/−13 |
|---|---|
| Viscosity, 40/100° C., cSt | 17.62/4.21 |
| VI | 150 |
| Carbon Number Distribution, Wt % | |
| $C_{28}$ | 55.91 |
| $C_{42}$ | 40.38 |
| $C_{56}$ | 3.71 |
| Simulated Distillation, LV %, °F. | |
| ST/5 | 713/751 |
| 10/30 | 765/780 |
| 50 | 790 |
| 70/90 | 942/965 |
| 95/99 | 972/1093 |

TABLE XVI

Inspections of Isomerized $C_{14}$ PAO

| Pour/Cloud Point, °C. | −54/−52 |
|---|---|
| Viscosity, 100° C., cSt | 4.035 |
| 40° C. | 17.68 |
| −18° C. | 384.8 |
| −40° C. | 3309 |
| VI | 129 |
| Simulated Distillation, LV %, °F. | |
| ST/5 | 602/718 |
| 10/30 | 743/766 |
| 50 | 775 |
| 70/90 | 854/938 |
| 95/99 | 947/1016 |

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A process for producing a $C_{20}+$ lube oil from a $C_{20}+$ olefin feed comprising isomerizing an olefin feed over a catalyst comprising an intermediate pore size silicoaluminophosphate molecular sieve and at least one Group VIII metal.

2. The process of claim 1 wherein said olefin feed is selected from the group consisting of normal internal olefin feeds, normal alphaolefin feeds, branched olefin feeds and mixtures thereof.

3. The process of claim 1 wherein said silicoaluminphosphate molecular sieve is selected from the group consisting of SAPO-11, SAPO-31 and SAPO-41.

4. The process of claim 3 wherein said Group VIII metal is selected from the group consisting of at least one of platinum, palladium, molybdenum, nickel, vanadium, cobalt, tungsten, zinc and mixtures thereof.

5. The process of claim 3 wherein said Group VIII metal is selected from the group consisting of at least one of platinum and palladium.

6. The process of claim 1 wherein said metal is present in an amount of from about 0.01% to about 10% by weight of the molecular sieve.

7. The process of claim 1 wherein said metal is present in an amount of from about 0.2% to about 5% by weight of the molecular sieve.

8. The process of claim 1 wherein the temperature is from about 200° C. to about 475° C.

9. The process of claim 8 wherein the pressure is from about 15 psig to about 2000 psig.

10. The process of claim 1 wherein the liquid hourly space velocity is from about 0.05 to about 20.

11. The process of claim 1 further comprising hydrofinishing the lube oil.

12. The process of claim 1 further comprising blending the lube oil with an oil selected form group consisting of at least one of polyalphaolefins, mineral oils and isomerized petroleum waxes.

13. A process for reducing the pour point of a $C_{20}+$ lube oil made from an olefin feed comprising isomerizing the lube oil over a catalyst comprising an intermediate pore size silicoaluminophosphate molecular sieve and at least one Group VIII metal.

14. The process of claim 13 wherein said olefin feed is selected from the group consisting of normal internal olefin feeds, normal alphaolefin feeds, branched olefin feeds and mixtures thereof.

15. The process of claim 13 wherein said silicoaluminophosphate molecular sieve is selected from the group consisting of SAPO-11, SAPO-31 and SAPO-41.

16. The process of claim 15 wherein said Group VIII metal is selected from the group consisting of at least one of platinum, palladium, molybdenum, nickel, vanadium, cobalt, tungsten, zinc and mixtures thereof.

17. The process of claim 15 wherein said Group VIII metal is selected from the group consisting of at least one of platinum and palladium.

18. The process of claim 13 wherein said metal is present in an amount of from about 0.01% to about 10% by weight of the molecular sieve.

19. The process of claim 13 wherein said metal is present in an amount of from about 0.2% to about 5% by weight of the molecular sieve.

20. The process of claim 13 wherein the temperature is from about 200° C. to about 475° C.

21. The process of claim 20 wherein the pressure is from about 15 to about 2000 psig.

22. The process of claim 13 wherein the liquid hourly space velocity is from about 0.05 to about 20.

23. The process of claim 13 further comprising (1) hydrofinishing the lube oil.

24. The process of claim 13 further comprising blending the lube oil with an oil selected from the group consisting of at least one of polyalphaolefins, mineral oils and isomerized petroleum waxes.

25. A process for producing a $C_{20}+$ lube oil from a $C_{20}+$ olefin feed comprising isomerizing an olefin feed over a catalyst comprising (1) an intermediate pore size nonzeolitic molecular sieve containing $AlO_2$ and $PO_2$ tetrahedral oxide units and (2) at least one Group VIII metal.

26. The process of claim 25 wherein said olefin feed is selected from the group consisting of normal internal olefin feeds, normal alphaolefin feeds, branched olefin feeds and mixtures thereof.

27. The process of claim 25 wherein said Group VIII metal is selected from the group consisting of at least one of platinum, palladium, molybdenum, nickel, vanadium, cobalt, tungsten, zinc and mixtures thereof.

28. The process of claim 25 wherein said Group VIII metal is selected from the group consisting of at least one of platinum and palladium.

29. The process of claim 25 wherein said metal is present in an amount of from about 0.01% to about 10% by weight of the molecular sieve.

30. The process of claim 25 wherein the temperature is from about 200° C. to about 475° C.

31. The process of claim 30 wherein the pressure is from about 15 psig to about 2000 psig.

32. The process of claim 25 wherein the liquid hourly space velocity is from about 0.05 to about 20.

33. The process of claim 25 further comprising hydrofinishing the lube oil.

34. The process of claim 25 further comprising blending the lube oil with an oil selected form group consisting of at least one of polyalphaolefins, mineral oils and isomerized petroleum waxes.

35. A process for reducing the pour point of a $C_{20}+$ lube oil made from an olefin feed comprising isomerizing a lube oil over a catalyst comprising (1) an intermediate pore size nonzeolitic molecular sieve containing $AlO_2$ and $PO_2$ tetrahedral oxide units and (2) at least one Group VIII metal.

36. The process of claim 35 wherein said olefin feed is selected from the group consisting of normal internal olefin feeds, normal alphaolefin feeds, branched olefin feeds and mixtures thereof.

37. The process of claim 35 wherein said Group VIII metal is selected from the group consisting of at least one of platinum, palladium, molybdenum, nickel, vanadium, cobalt, tungsten, zinc and mixtures thereof.

38. The process of claim 36 wherein said Group VIII metal is selected from the group consisting of at least one of platinum and palladium.

39. The process of claim 35 wherein said metal is present in an amount of from about 0.01% to about 10% by weight of the molecular sieve.

40. The process of claim 35 wherein the temperature is from about 200° C. to about 475° C.

41. The process of claim 40 wherein the pressure is from about 15 psig to about 2000 psig.

42. The process of claim 35 wherein the liquid hourly space velocity is from about 0.05 to about 20.

43. The process of claim 35 further comprising hydrofinishing the lube oil.

44. The process of claim 35 further comprising blending the lube oil with an oil selected form group consisting of at least one of polyalphaolefins, mineral oils and isomerized petroleum waxes.

* * * * *